US011419466B2

(12) United States Patent
Johnson, III et al.

(10) Patent No.: US 11,419,466 B2
(45) Date of Patent: Aug. 23, 2022

(54) DUST COLLECTOR ASSEMBLY

(71) Applicant: MILWAUKEE ELECTRIC TOOL CORPORATION, Brookfield, WI (US)

(72) Inventors: Allen H. Johnson, III, Milwaukee, WI (US); Daniel Simmons, Milwaukee, WI (US); Taylor Crabb, Brookfield, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days.

(21) Appl. No.: 17/212,365

(22) Filed: Mar. 25, 2021

(65) Prior Publication Data
US 2021/0298546 A1 Sep. 30, 2021

Related U.S. Application Data

(60) Provisional application No. 62/994,308, filed on Mar. 25, 2020.

(51) Int. Cl.
*A47L 7/00* (2006.01)
*A47L 9/24* (2006.01)
(Continued)

(52) U.S. Cl.
CPC ............. *A47L 7/0095* (2013.01); *A47L 9/248* (2013.01); *A47L 9/2842* (2013.01); *B08B 15/04* (2013.01); *B22F 2003/247* (2013.01)

(58) Field of Classification Search
USPC ................................................ 15/300.1, 414
See application file for complete search history.

(56) References Cited

U.S. PATENT DOCUMENTS

| 2,770,172 A | 11/1956 | Graves |
| 2,990,024 A | 6/1961 | Van Allsburg |

(Continued)

FOREIGN PATENT DOCUMENTS

| CN | 2303710 Y | 1/1999 |
| CN | 201711945 U | 1/2011 |

(Continued)

OTHER PUBLICATIONS

Tool Specialist, "D25302DH 36 Volt Dust Extraction System Dewalt D25302DH-XJ," <https://www.toolspecialist.be/d25302dh-36-volt-dust-extraction-system-dewalt-d25302dh-xj?_store=fr&> webpage accessed Apr. 3, 2019.

(Continued)

*Primary Examiner* — Joseph J Hail
*Assistant Examiner* — Dana Lee Poon
(74) *Attorney, Agent, or Firm* — Michael Best & Friedrich LLP

(57) ABSTRACT

A dust collector for use with a hand-held power tool includes a housing, a suction pipe coupled to the housing, and an electric motor positioned in the housing. The dust collector additionally includes a suction fan driven by the electric motor and operable to generate a vacuum in the suction pipe, and a depth stop assembly. The depth stop assembly is configured to limit the axial movement of the suction pipe. The depth stop assembly is configured to be alternately positioned on opposite sides of the suction pipe in a first configuration and a second configuration, respectively.

20 Claims, 7 Drawing Sheets

(51) Int. Cl.
*A47L 9/28* (2006.01)
*B08B 15/04* (2006.01)
*B22F 3/24* (2006.01)

(56) References Cited

U.S. PATENT DOCUMENTS

| | | | |
|---|---|---|---|
| 3,317,947 A | 5/1967 | Jacobi et al. | |
| 3,320,725 A | 5/1967 | Foster | |
| 3,591,888 A | 7/1971 | Takeda et al. | |
| 3,708,962 A | 1/1973 | Deguchi et al. | |
| 3,739,421 A | 6/1973 | Fukuba | |
| 3,776,647 A | 12/1973 | Hart | |
| 3,850,254 A | 11/1974 | Hirdes | |
| 4,097,176 A | 6/1978 | Wanner et al. | |
| 4,192,390 A | 3/1980 | Wanner et al. | |
| 4,207,953 A | 6/1980 | Reibetanz et al. | |
| 4,250,971 A | 2/1981 | Reibetanz et al. | |
| 4,652,184 A | 3/1987 | Fischer | |
| 4,711,609 A | 12/1987 | Seefluth | |
| 4,921,375 A | 5/1990 | Lenarduzzi | |
| 5,033,917 A | 7/1991 | McGlasson et al. | |
| 5,090,499 A | 2/1992 | Cuneo | |
| 5,129,467 A | 7/1992 | Watanabe et al. | |
| 5,199,501 A | 4/1993 | Kluber et al. | |
| 5,292,210 A | 3/1994 | Nowick | |
| 5,688,082 A | 11/1997 | Richardson | |
| 5,765,654 A | 6/1998 | Burger | |
| 5,899,644 A | 5/1999 | Buck et al. | |
| 5,993,122 A | 11/1999 | Baker | |
| 6,443,676 B1 | 9/2002 | Kopras | |
| 6,587,184 B2 | 7/2003 | Wursch et al. | |
| 6,615,930 B2 | 9/2003 | Bongers-Ambrosius et al. | |
| D499,946 S | 12/2004 | Stirm | |
| 6,835,030 B2 | 12/2004 | Pozgay et al. | |
| 6,848,985 B2 | 2/2005 | Lamprecht et al. | |
| 6,851,898 B2 | 2/2005 | Ege et al. | |
| 6,854,938 B2 | 2/2005 | Kopras et al. | |
| 6,887,146 B2 | 5/2005 | Staas et al. | |
| 6,951,439 B2 | 10/2005 | Arieh | |
| 6,964,546 B1 | 11/2005 | Vakil | |
| 7,017,680 B2 | 3/2006 | Arich et al. | |
| 7,118,609 B2 | 10/2006 | Valentini | |
| 7,168,128 B2 | 1/2007 | Evans | |
| 7,182,150 B2 | 2/2007 | Grossman | |
| 7,186,281 B2 | 3/2007 | Cheng | |
| 7,220,088 B2 | 5/2007 | Ferrari et al. | |
| 7,281,886 B2 | 10/2007 | Stoerig | |
| 7,282,074 B1 | 10/2007 | Witter | |
| 7,322,429 B2 | 1/2008 | Kim | |
| 7,323,023 B2 | 1/2008 | Michele et al. | |
| 7,347,651 B2 | 3/2008 | Hintze et al. | |
| 7,350,267 B2 | 4/2008 | Evans | |
| 7,354,226 B2 | 4/2008 | Britz | |
| 7,425,109 B2 | 9/2008 | Simm et al. | |
| 7,455,486 B2 | 11/2008 | Britz | |
| 7,644,469 B2 | 1/2010 | Beers et al. | |
| 7,794,184 B2 | 9/2010 | Di Nicolantonio et al. | |
| 7,797,794 B2 | 9/2010 | Bleicher et al. | |
| 7,871,463 B2 | 1/2011 | Hayama et al. | |
| 7,875,094 B2 | 1/2011 | Baumann et al. | |
| 7,909,114 B2 | 3/2011 | Nishikawa et al. | |
| 7,962,994 B2 | 6/2011 | Beers | |
| 7,966,691 B2 | 6/2011 | Takahashi et al. | |
| 8,052,357 B2 | 11/2011 | Bruntner | |
| 8,118,520 B2 | 2/2012 | Hintze et al. | |
| 8,186,453 B2 | 5/2012 | Furusawa et al. | |
| 8,266,761 B2 | 9/2012 | Beers | |
| 8,272,134 B2 | 9/2012 | Soika et al. | |
| 8,342,782 B2 | 1/2013 | Nishikawa et al. | |
| D677,139 S | 3/2013 | Yamamoto et al. | |
| D677,545 S | 3/2013 | Sell | |
| 8,388,415 B2 | 3/2013 | Soika et al. | |
| 8,397,342 B2 | 3/2013 | Baker et al. | |
| 8,424,615 B2 | 4/2013 | Baumann et al. | |
| 8,443,914 B2 | 5/2013 | Bito | |
| 8,479,964 B2 | 7/2013 | Furusawa et al. | |
| 8,529,169 B2 | 9/2013 | Nishikawa et al. | |
| 8,529,170 B2 | 9/2013 | Everington, Jr. | |
| 8,561,512 B2 | 10/2013 | Loveless et al. | |
| 8,651,776 B2 | 2/2014 | Khurana | |
| 8,696,267 B2 | 4/2014 | Khurana | |
| 8,740,513 B2 | 6/2014 | Santamarina et al. | |
| 8,813,868 B2 | 8/2014 | Limberg et al. | |
| 8,834,641 B2 | 9/2014 | Baker et al. | |
| 8,869,786 B2 | 10/2014 | Faiweather et al. | |
| 8,876,932 B2 | 11/2014 | Machida et al. | |
| 8,906,124 B2 | 12/2014 | Yoshikane et al. | |
| 8,915,309 B2 | 12/2014 | Kakiuchi et al. | |
| 8,944,182 B2 | 2/2015 | Chen et al. | |
| 8,967,923 B2 | 3/2015 | Lech et al. | |
| 8,997,887 B2 | 4/2015 | Furusawa et al. | |
| 9,022,702 B2 | 5/2015 | Kasuya et al. | |
| 9,033,769 B2 | 5/2015 | Mizutani et al. | |
| 9,056,379 B2 | 6/2015 | Yoshikane et al. | |
| 9,067,292 B2 | 6/2015 | Appel | |
| 9,073,160 B2 | 7/2015 | Appel et al. | |
| 9,108,284 B2 | 8/2015 | Yoshitaka | |
| 9,114,491 B2 | 8/2015 | Kakiuchi | |
| 9,132,572 B2 | 9/2015 | Ishikawa et al. | |
| 9,193,021 B2 | 11/2015 | Machida et al. | |
| 9,221,110 B2 | 12/2015 | Guth | |
| 9,296,079 B2 | 3/2016 | Masanori | |
| 9,505,095 B2 | 11/2016 | Machida et al. | |
| 9,656,361 B2 | 5/2017 | Appel et al. | |
| 9,776,296 B2 | 10/2017 | Brewster et al. | |
| 9,855,632 B2 | 1/2018 | Rubens et al. | |
| 9,943,940 B2 | 4/2018 | Furusawa et al. | |
| 9,956,659 B2 | 5/2018 | Takeuchi et al. | |
| 10,238,252 B2 | 3/2019 | Buczek | |
| 10,328,541 B2 | 6/2019 | Wong et al. | |
| 2001/0052429 A1 | 12/2001 | Frenzel et al. | |
| 2002/0154960 A1 | 10/2002 | Lin | |
| 2003/0044247 A1 | 3/2003 | Wolfe | |
| 2008/0189899 A1 | 8/2008 | Beers et al. | |
| 2008/0203679 A1 | 8/2008 | Hermoso | |
| 2009/0136309 A1 | 5/2009 | Coulston et al. | |
| 2009/0139047 A1 | 6/2009 | Williams | |
| 2010/0000386 A1 | 1/2010 | Dagn | |
| 2012/0063856 A1 | 3/2012 | Miwa et al. | |
| 2012/0234570 A1 | 9/2012 | Machida et al. | |
| 2013/0055523 A1* | 3/2013 | Yoshikane | B23Q 11/0046 15/347 |
| 2013/0213683 A1 | 8/2013 | Brewster et al. | |
| 2014/0326476 A1 | 11/2014 | Harrison | |
| 2015/0040341 A1 | 2/2015 | Wiedemann et al. | |
| 2015/0360298 A1 | 12/2015 | Buczek | |
| 2016/0016270 A1 | 1/2016 | Batres et al. | |
| 2016/0100724 A1 | 4/2016 | Valentini | |
| 2016/0250731 A1 | 9/2016 | Wong et al. | |
| 2017/0056988 A1 | 3/2017 | Guth | |
| 2017/0057037 A1 | 3/2017 | Lauer | |
| 2017/0087707 A1 | 3/2017 | Appel | |
| 2017/0173748 A1 | 6/2017 | Ullrich et al. | |
| 2017/0197306 A1 | 7/2017 | Vasudeva | |
| 2017/0203402 A1* | 7/2017 | Machida | B01D 46/0027 |
| 2017/0232565 A1 | 8/2017 | Machida | |
| 2017/0348812 A1 | 12/2017 | Harrison | |
| 2017/0355053 A1 | 12/2017 | Furusawa et al. | |
| 2018/0021905 A1 | 1/2018 | Furusawa et al. | |
| 2018/0028032 A1 | 2/2018 | Schuele et al. | |
| 2018/0085873 A1 | 3/2018 | Rompel et al. | |
| 2018/0147681 A1 | 5/2018 | Le et al. | |
| 2018/0200852 A1 | 7/2018 | Yoshikane | |
| 2018/0311778 A1 | 11/2018 | Meiser et al. | |
| 2019/0091819 A1 | 3/2019 | Mori et al. | |
| 2919/0084109 | 3/2019 | Nemetz et al. | |
| 2019/0101422 A1 | 4/2019 | Koenigbauer et al. | |
| 2019/0193224 A1 | 6/2019 | Furusawa et al. | |
| 2019/0224797 A1 | 7/2019 | Seipp et al. | |
| 2019/0291226 A1* | 9/2019 | Tada | B23Q 11/0071 |

(56) References Cited

U.S. PATENT DOCUMENTS

| | | | | |
|---|---|---|---|---|
| 2019/0314943 | A1* | 10/2019 | Machida | ............ B23Q 11/0046 |
| 2020/0156199 | A1* | 5/2020 | Richards | ............... B23B 49/006 |

FOREIGN PATENT DOCUMENTS

| | | | |
|---|---|---|---|
| CN | 102581338 | A | 7/2012 |
| CN | 101528425 | B | 8/2012 |
| CN | 202399238 | U | 8/2012 |
| CN | 102658384 | A | 9/2012 |
| CN | 202623731 | U | 12/2012 |
| CN | 202845846 | U | 4/2013 |
| CN | 203542553 | U | 4/2014 |
| CN | 203702040 | U | 7/2014 |
| CN | 104002282 | A | 8/2014 |
| CN | 203830787 | U | 9/2014 |
| CN | 204108375 | U | 1/2015 |
| CN | 104439404 | A | 3/2015 |
| CN | 104741660 | A | 7/2015 |
| CN | 204486857 | U | 7/2015 |
| CN | 104907307 | A | 9/2015 |
| CN | 103537729 | B | 10/2015 |
| CN | 204686102 | U | 10/2015 |
| CN | 204686556 | U | 10/2015 |
| CN | 113769648 | B | 1/2016 |
| CN | 105312622 | A | 2/2016 |
| CN | 103537731 | B | 4/2016 |
| CN | 105478857 | A | 4/2016 |
| CN | 205184689 | U | 4/2016 |
| CN | 103030267 | B | 6/2016 |
| CN | 105772798 | A | 7/2016 |
| CN | 205799418 | U | 12/2016 |
| CN | 108312129 | A | 1/2017 |
| CN | 106419728 | A | 2/2017 |
| CN | 106584371 | A | 4/2017 |
| CN | 106667369 | A | 5/2017 |
| CN | 104070504 | B | 6/2017 |
| CN | 106976043 | A | 7/2017 |
| CN | 206296530 | U | 7/2017 |
| CN | 206306082 | U | 7/2017 |
| CN | 107008943 | A | 8/2017 |
| CN | 206614058 | U | 11/2017 |
| CN | 107520815 | A | 12/2017 |
| CN | 207272245 | U | 4/2018 |
| CN | 108127622 | A | 6/2018 |
| CN | 105642947 | B | 7/2018 |
| CN | 108480718 | A | 9/2018 |
| CN | 108581966 | A | 9/2018 |
| CN | 108673229 | A | 10/2018 |
| CN | 108788244 | A | 11/2018 |
| CN | 208100283 | U | 11/2018 |
| CN | 109249061 | A | 1/2019 |
| CN | 208514443 | U | 2/2019 |
| CN | 106964814 | B | 3/2019 |
| CN | 208697349 | U | 4/2019 |
| CN | 208744735 | U | 4/2019 |
| DE | 2534169 | A1 | 2/1977 |
| DE | 2546531 | A1 | 4/1977 |
| DE | 7710805 | U1 | 7/1977 |
| DE | 2741536 | A1 | 3/1979 |
| DE | 2925908 | A1 | 1/1981 |
| DE | 3006799 | A1 | 7/1981 |
| DE | 3146225 | A1 | 5/1983 |
| DE | 3324615 | C2 | 5/1984 |
| DE | 2940362 | C2 | 11/1985 |
| DE | 3501753 | A1 | 7/1986 |
| DE | 3509199 | C2 | 12/1987 |
| DE | 3827556 | A1 | 2/1990 |
| DE | 4321906 | A1 | 3/1994 |
| DE | 4342484 | A1 | 4/1995 |
| DE | 4406597 | A1 | 9/1995 |
| DE | 19860182 | C2 | 7/2000 |
| DE | 10112129 | A1 | 9/2002 |
| DE | 20301042 | U1 | 3/2003 |
| DE | 20302753 | U1 | 8/2003 |
| DE | 10342515 | A1 | 5/2005 |
| DE | 102004045625 | A1 | 4/2006 |
| DE | 10319597 | B4 | 7/2006 |
| DE | 102005062464 | A1 | 6/2007 |
| DE | 202006009078 | U1 | 10/2007 |
| DE | 102006029624 | A1 | 1/2008 |
| DE | 102006039969 | A1 | 2/2008 |
| DE | 19807282 | 64 | 4/2008 |
| DE | 102007019704 | A1 | 11/2008 |
| DE | 102009054968 | A1 | 6/2011 |
| DE | 202010009989 | U1 | 4/2012 |
| DE | 102011075013 | A1 | 10/2012 |
| DE | 202012007437 | U1 | 11/2012 |
| DE | 102012200543 | A1 | 7/2013 |
| DE | 102012211635 | A1 | 1/2014 |
| DE | 102012221068 | A1 | 5/2014 |
| DE | 102012221077 | A1 | 5/2014 |
| DE | 102013212022 | A1 | 1/2015 |
| DE | 102013215788 | A1 | 2/2015 |
| DE | 102013018278 | A1 | 4/2015 |
| DE | 202016104254 | U1 | 9/2016 |
| DE | 102015219224 | A1 | 4/2017 |
| DE | 202017100783 | U1 | 4/2017 |
| DE | 102016014210 | A1 | 10/2017 |
| DE | 102016225015 | A1 | 6/2018 |
| DE | 102017201560 | A1 | 8/2018 |
| DE | 102017201565 | A1 | 8/2018 |
| EP | 426321 | A1 | 5/1991 |
| EP | 295225 | B1 | 4/1993 |
| EP | 548782 | B1 | 4/1997 |
| EP | 855244 | 61 | 1/2003 |
| EP | 1023967 | B1 | 10/2004 |
| EP | 1604777 | B1 | 9/2006 |
| EP | 1377412 | B1 | 7/2007 |
| EP | 1714735 | B1 | 10/2007 |
| EP | 1714733 | B1 | 11/2007 |
| EP | 1872900 | B1 | 1/2008 |
| EP | 1714734 | B1 | 3/2008 |
| EP | 1923149 | B1 | 5/2008 |
| EP | 1923174 | B1 | 5/2008 |
| EP | 1923177 | B1 | 5/2008 |
| EP | 1714732 | B1 | 7/2008 |
| EP | 1429891 | B1 | 6/2009 |
| EP | 1872916 | B1 | 12/2011 |
| EP | 2474386 | B1 | 7/2012 |
| EP | 2481522 | A2 | 8/2012 |
| EP | 2363237 | B1 | 1/2014 |
| EP | 2011992 | B1 | 11/2014 |
| EP | 2594360 | B1 | 6/2015 |
| EP | 2174749 | B1 | 7/2017 |
| EP | 3132890 | B1 | 10/2018 |
| EP | 3461596 | A1 | 4/2019 |
| GB | 1602263 | A | 11/1981 |
| GB | 2486805 | A | 6/2012 |
| JP | 2010012573 | A | 1/2010 |
| WO | WO 199852723 | A1 | 11/1998 |
| WO | WO 2005025792 | A1 | 3/2005 |
| WO | WO 2006027977 | A1 | 3/2006 |
| WO | WO 2008003544 | A1 | 1/2008 |
| WO | WO 2010035395 | A1 | 4/2010 |
| WO | WO 2010102846 | A1 | 9/2010 |
| WO | WO 2010116879 | A1 | 10/2010 |
| WO | WO 2010137446 | A1 | 12/2010 |
| WO | WO 2014168114 | A1 | 10/2014 |
| WO | WO 2019101558 | A1 | 5/2019 |

OTHER PUBLICATIONS

Makita Tools, "Makita 1" Rotary Hammers Deliver Performance, Less Vibration and Dust Extraction, New AVT rotary hammers with HEPA vacuums are OSHA compliant and ideal for overhead drilling, <https://www.makitatools.com/company/press-releases/2017/makita-1-rotary-hammers-deliver-performance> published Aug. 14, 2017.

International Search Report and Written Opinion for Application No. PCT/US2021/024096 dated Jul. 14, 2021 (12 pages).

* cited by examiner

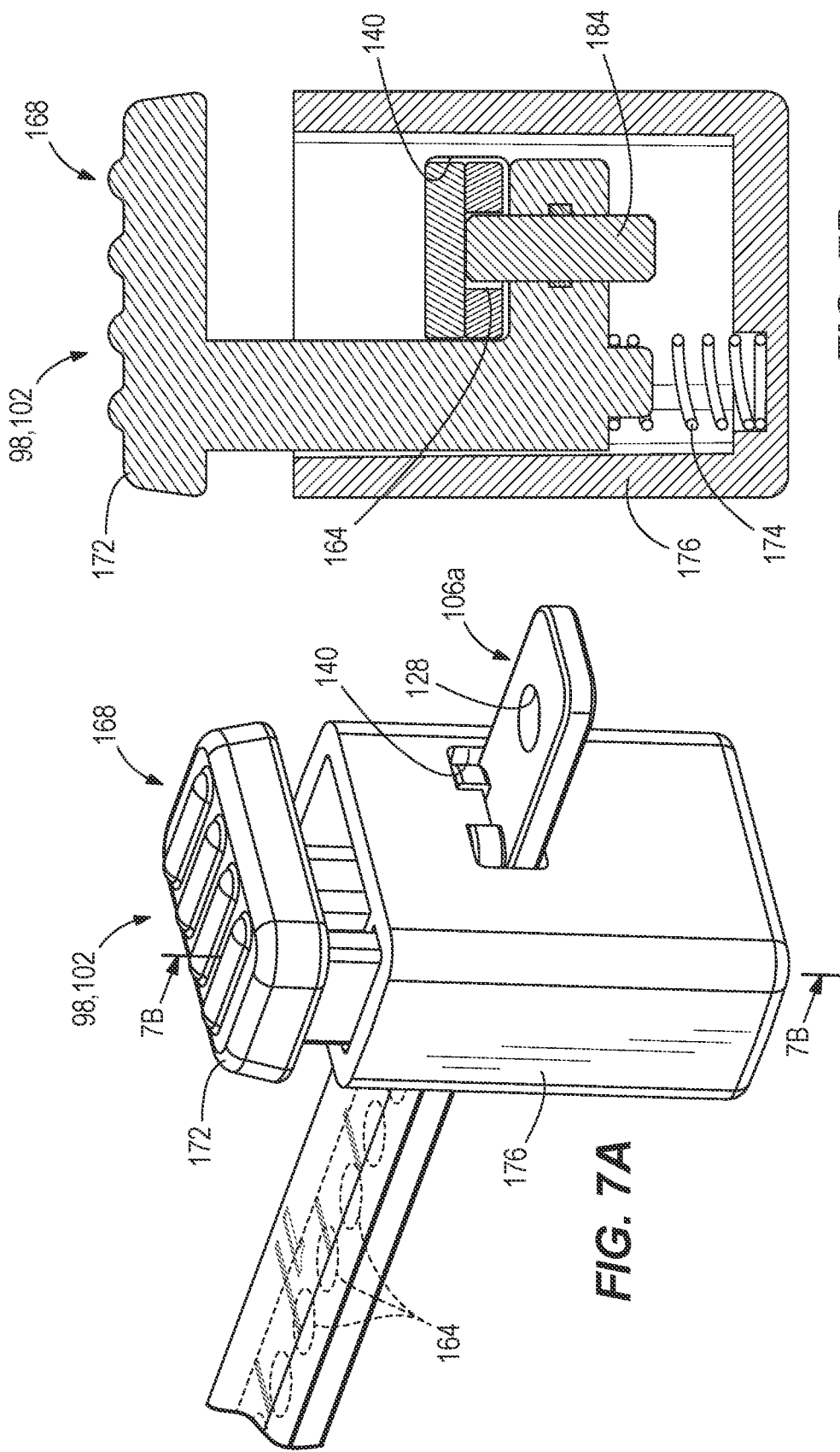

DUST COLLECTOR ASSEMBLY

CROSS-REFERENCE TO RELATED APPLICATIONS

This application claims priority to U.S. Provisional Patent Application No. 62/994,308 filed on Mar. 25, 2020, the entire content of which is incorporated herein by reference.

FIELD OF THE INVENTION

The present invention relates to power tools, and more particularly to dust collectors for use with power tools.

BACKGROUND OF THE INVENTION

Dust collectors are typically used in tandem with handheld drilling tools such as rotary hammers to collect dust and other debris during a drilling operation to prevent dust and other debris from accumulating at a worksite. Such dust collectors may be attached to a rotary hammer to position a suction inlet of the collector proximate a drill bit attached to the rotary hammer. Such dust collectors may also include an on-board dust container in which dust and other debris is accumulated. Such dust containers are often removable from the dust collector to facilitate disposal of the accumulated dust and debris.

SUMMARY OF THE INVENTION

The invention provides, in one aspect, a dust collector for use with a hand-held power tool, including a housing, a suction pipe coupled to the housing, an electric motor positioned in the housing, a suction fan driven by the electric motor and operable to generate a vacuum in the suction pipe, and a depth stop assembly configured to limit the axial movement of the suction pipe, wherein the depth stop assembly is configured to be alternately positioned on opposite sides of the suction pipe in a first configuration and a second configuration, respectively.

The invention provides, in another aspect, a dust collector for use with a hand-held power tool, including a housing, a suction pipe coupled to the housing, a suction head coupled to the suction pipe, an electric motor positioned in the housing, a suction fan driven by the electric motor and operable to generate a vacuum in the suction pipe, and a depth stop assembly configured to limit the axial movement of the suction pipe, the depth stop assembly including a rail, a depth stop and an extension stop adjustably positioned on the rail, and a bracket removably coupled to the suction head, wherein the depth stop assembly is configured to be alternately positioned on opposite sides of the suction pipe in a first configuration and a second configuration, respectively.

The invention provides, in another aspect, a dust collector for use with a hand-held power tool, including a housing, a suction pipe coupled to the housing, a suction head coupled to the suction pipe, an electric motor positioned in the housing, a suction fan driven by the electric motor and operable to generate a vacuum in the suction pipe, and a depth stop assembly configured to limit the axial movement of the suction pipe. The depth stop assembly includes a rail having a first end removably coupled to a first bracket and a second end removably coupled to a second bracket. The depth stop assembly also includes a depth stop and an extension stop adjustably positioned on the rail. The depth stop assembly is configured to be alternately positioned in a first configuration when the first bracket is coupled to a first side of the suction head and the second bracket is coupled to a first side of the housing, and a second configuration when the first bracket is coupled to a second side of the suction head and the second bracket is coupled to a second side of the housing.

Other features and aspects of the invention will become apparent by consideration of the following detailed description and accompanying drawings.

BRIEF DESCRIPTION OF THE DRAWINGS

FIG. 7A is a perspective view of a plunge depth stop of the dust collector assembly of FIG. 1.

FIG. 7B is a cross-sectional view of the plunge depth stop of FIG. 7A along section line 7B-7B in FIG. 7A.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
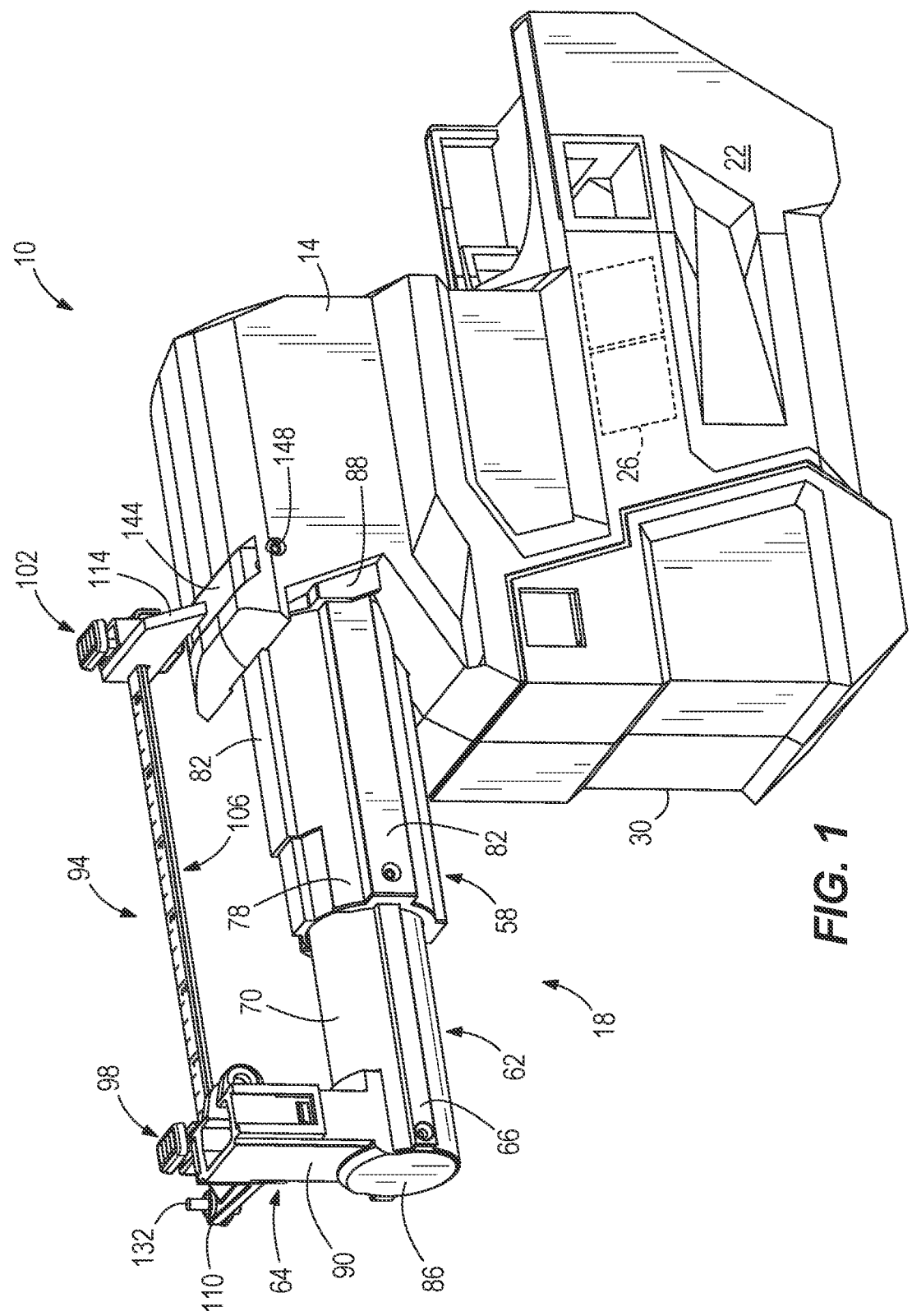
FIG. 1 is a perspective view of a dust collector assembly configured to be mounted to a rotary power tool.
Figure 2:
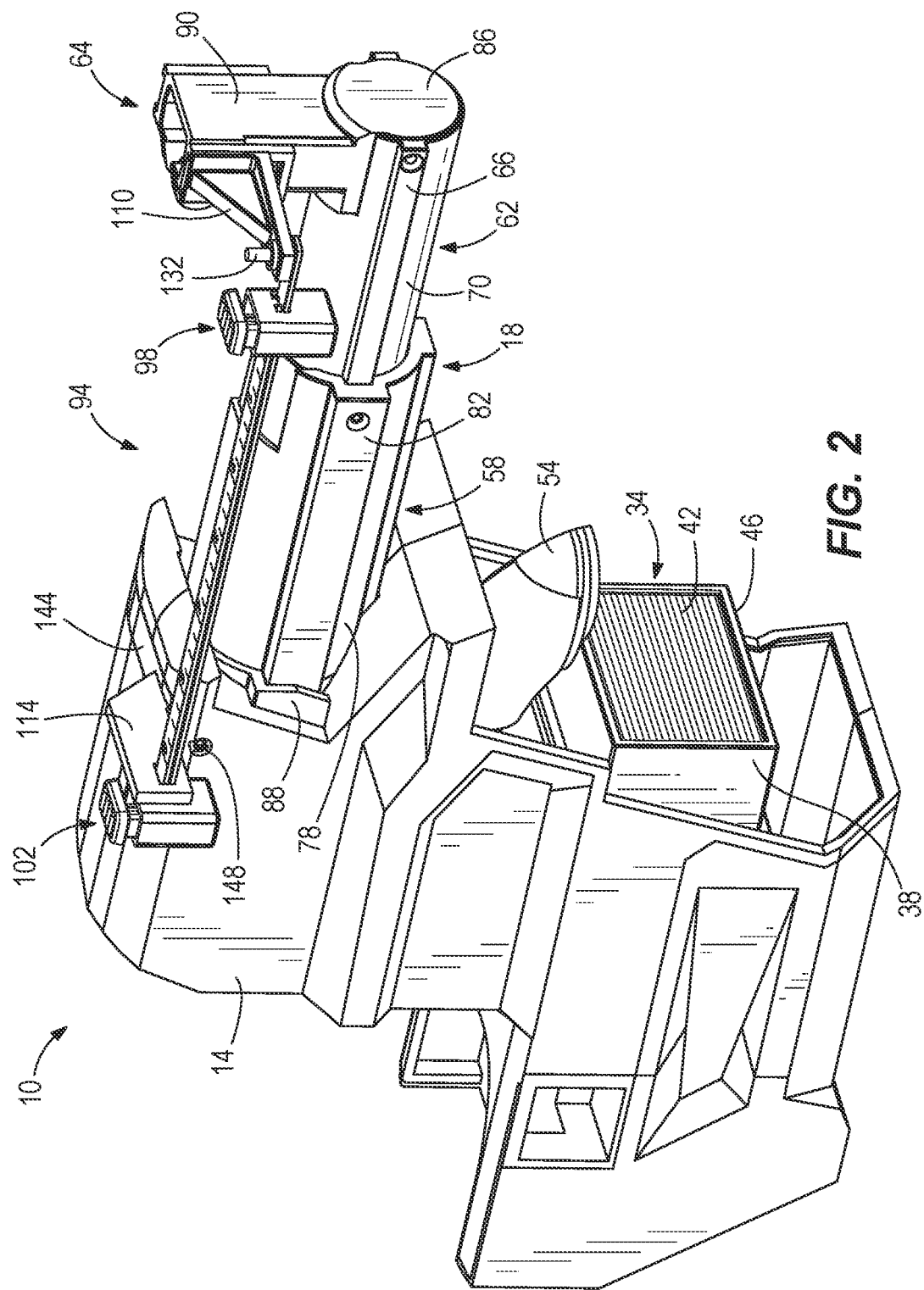
FIG. 2 is another perspective view of the dust collector assembly of FIG. 1, with a dust container removed.

FIGS. 1 and 2 illustrate a dust collector assembly 10 operable with a power tool. As will be described in more detail below, the dust collector assembly 10 is operable to collect dust and other debris from a workpiece during a drilling and/or hammering operation performed by the power tool to maintain the user's work area substantially clear of dust. The power tool is a drilling machine or rotary power tool, which may be configured as a percussion rotary power tool, a rotary hammer, or a hammer drill. The power tool includes a housing in which a spindle is drivable in a rotary manner about an axis of rotation. For this purpose, the rotary power tool includes an electric motor for driving rotation of the spindle. The power tool is powered by a battery, such as a rechargeable battery pack. In other embodiments, the power tool may include a cord to enable the power tool to be powered by AC power. The rotary power tool is also equipped with a handle. It may thus be operated by hand and accordingly be designated a hand-held rotary power tool.

The dust collector assembly 10 constitutes a separate device from the rotary power tool, and may be attached and detached to the rotary power tool without using tools. The dust collector assembly 10 and the power tool share a power source. For example, the dust collector assembly 10 is powered by the battery of the power tool. In addition, in some embodiments, one or both of the power tool and the dust collector assembly 10 may include a cord that provides AC power.

The dust collector assembly 10 includes a housing 14, a telescoping suction pipe 18 coupled to the housing 14, an electric motor 22 positioned in the housing 14 and powered by the power tool battery, a suction fan 26 driven by the electric motor 22 and operable to generate a vacuum in the suction pipe 18, and a dust container 30 coupled to the housing 14 and positioned upstream of the suction fan 26. In addition, the dust collector assembly 10 includes a handle assembly (not shown) that supports the power tool in a side-by-side relationship with the dust collector assembly 10.

With reference to FIG. 2, the dust collector assembly 10 includes a filter 34 supported by at least one of the housing 14 or the dust container 30. In the illustrated embodiment of the dust collector assembly 10, the filter 34 includes a filter housing 38, a pleated element 42 within the filter housing 38, and a rim 46 surrounding the pleated element 42. The rim 46 is trapped between the dust container 30 and the housing 14 when the dust container 30 is attached to the housing 14. Alternatively, the dust collector assembly 10 may incorporate additional structure for securing the filter 34 to the dust container 30 prior to the dust container 30 being attached to the housing 14. When the dust container 30 is removed from the housing 14, the filter 34 is accessible and removable from the dust container 30 for servicing and/or replacement by merely pulling the filter 34 (by, for example, grasping the rim 46) from the dust container 30 after the dust container 30 has been removed or detached from the housing 14. The filter 34 may be configured as a high efficiency particulate air ("HEPA") filter.

With continued reference to FIG. 2, the dust collector 110 may include a vacuum hose adapter 54 configured to connect to an external vacuum source (not shown). Typically, the dust is sucked through the suction pipe 18 and is collected in a dust container 30. The dust container 30 can then be removed to empty the dust container 30. However, when excessive amounts of dust are being dispelled into the dust container 30, a user will have to repeatedly remove the dust container 30, interrupting their productivity. Therefore, the vacuum hose adapter 54 may be attached to the end of the suction pipe 18, so that the dust container 30 can be removed and a hose from an external vacuum source can be attached to the vacuum hose adapter 54. This allows for a large vacuum source, such as a portable shop vacuum, to be used with the power tool via the dust collector assembly 10.

With reference to FIG. 1, the telescoping suction pipe 18 includes an outer pipe 58 arranged on the housing 14 and an inner pipe 62 is arranged coaxially therewith and positioned inside the outer pipe 58 so as to be slidable in a telescoping manner. The inner pipe 62 carries a suction head 64 (only partially shown in FIGS. 1-2 and 4). The effective extended length of the suction pipe 18 is axially adjustable so that the dust collector 10 may be adapted to differing lengths of the drilling tool with which it is used, for example, a drill bit, a masonry drill bit, or a hammer drill bit. The telescoping capability of the suction pipe 18 enables the dust collector 10 to be adjusted automatically and steplessly to the drilling depth while the rotary power tool is being operated. As the depth of the hole created with the drilling tool increases, the inner pipe 62 retracts into the outer pipe 58. In some embodiments, the inner pipe 62 is arranged on the housing 14 and the outer pipe 58 is positioned in front of the inner pipe 62, and carries the suction head 64. In such instances, as a drill bit of the power tool plunges into the workpiece, the outer pipe 58 retracts over the inner pipe 62 in a telescoping manner.

Figure 6:
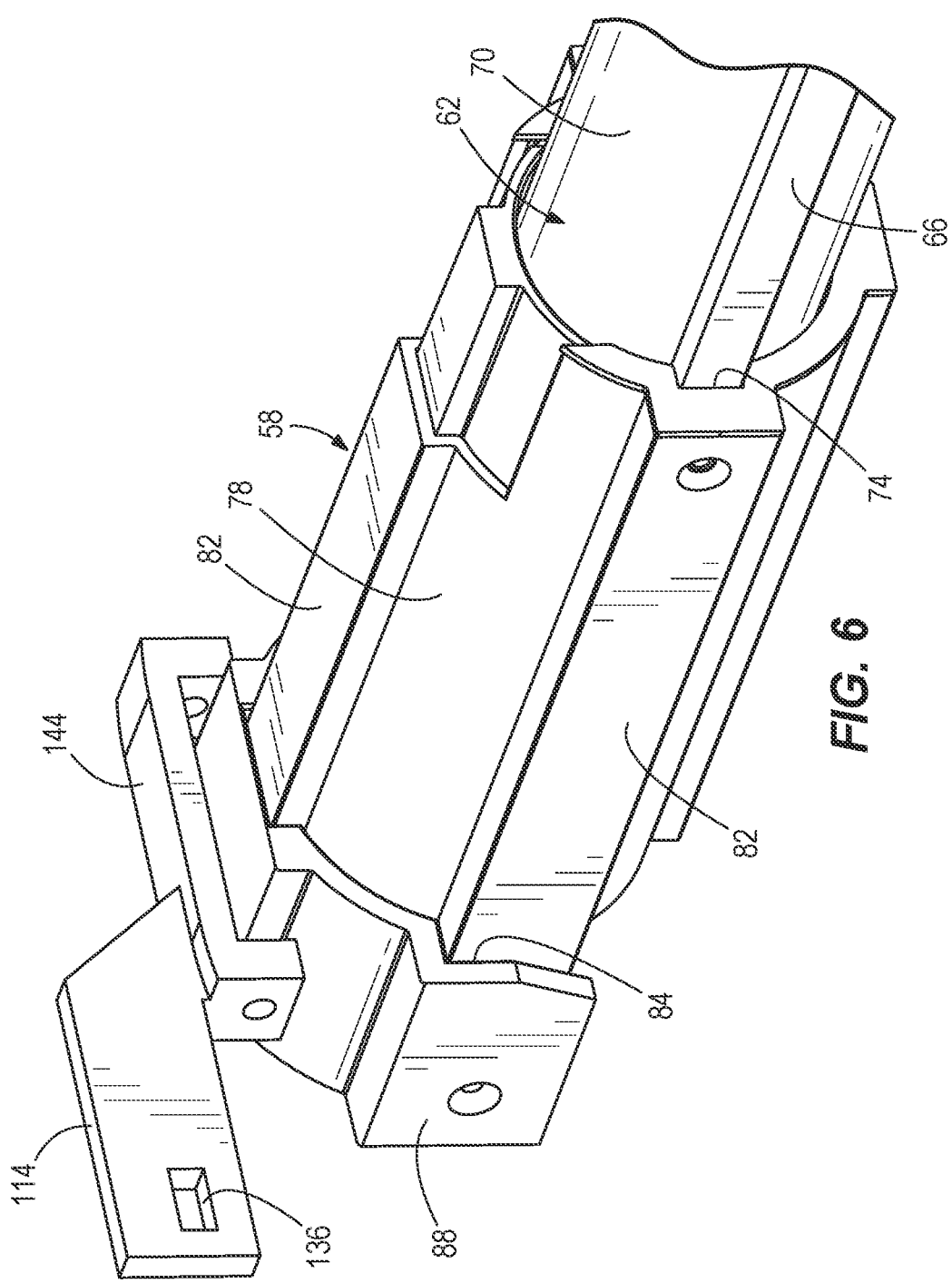
FIG. 6 is a perspective view of a second bracket engagable with the housing of the dust collector of FIG. 1.

With reference to FIGS. 1-4, the inner pipe 62 includes projections 66 extending radially outward from a main cylindrical body 70 of the inner pipe 62, and along the length of the inner pipe 62. The projections 66 are configured to be received within corresponding recesses 74 (FIG. 6) formed within a main cylindrical body 78 of the outer pipe 58, and extending along the length of the outer pipe 58. Projections 82 are formed along the length of the outer pipe 58 and extend radially outward from the main cylindrical body 78 of the outer pipe 58. The projections 82 correspond to the recesses 74 and are radially aligned with the underlying recesses 74, such that the underlying recesses 74 are defined within the corresponding projections 82. The projections 82 are configured to be received within corresponding recesses 84 formed within a mounting member 88 of the housing 14.

Figure 5:
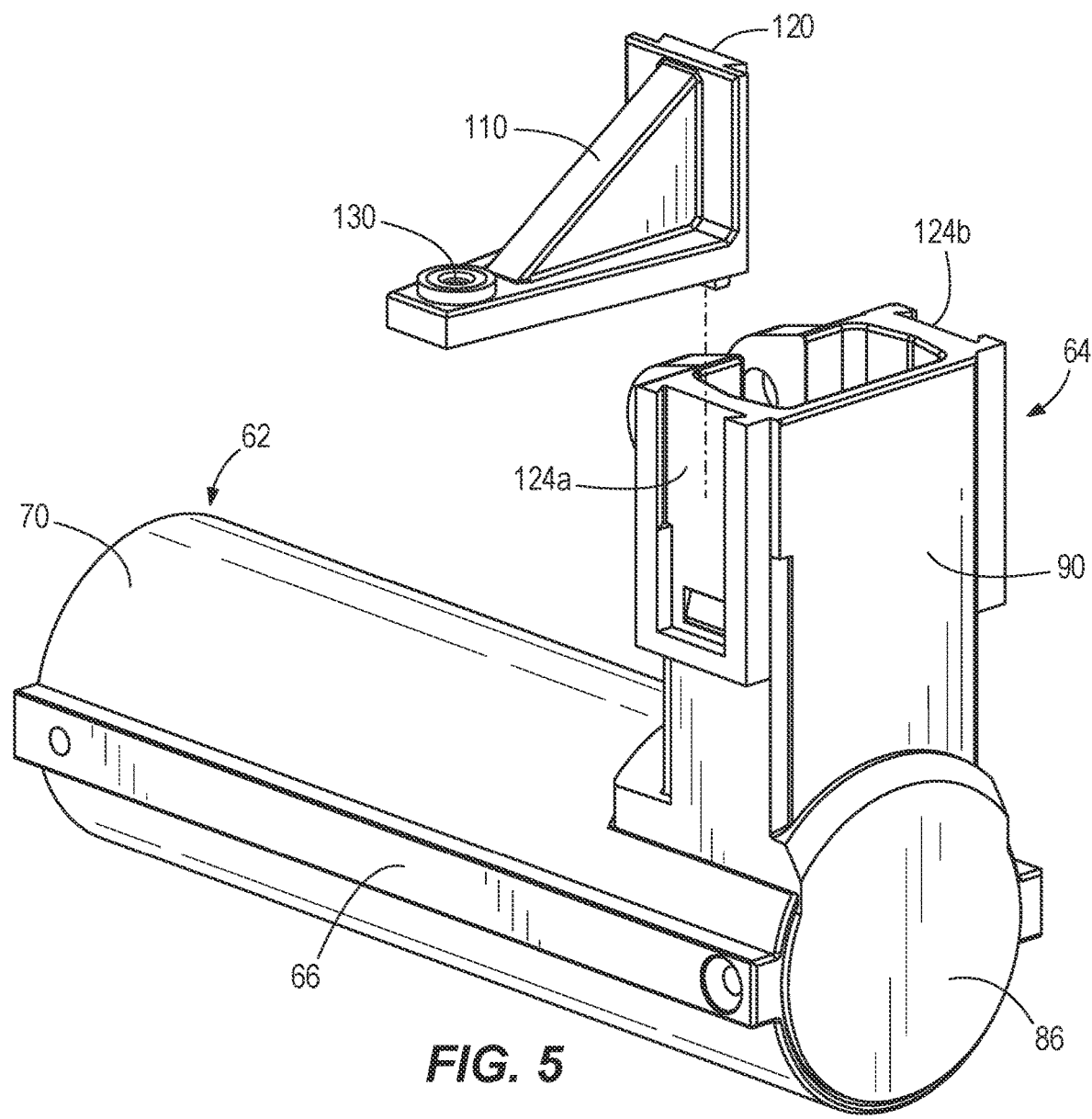
FIG. 5 is a perspective view of a first bracket engagable with a suction head of the dust collector assembly of FIG. 1.

With reference to FIG. 5, the suction head 64 of the dust collector assembly 10 is coupled to the end of the suction pipe 18. The suction head 64 includes a hub 86, a hollow arm 90 laterally extending from the hub 86, and a shroud (not shown) coupled to the end of the arm 90. The shroud defines a suction inlet through which air is drawn during operation of the dust collector assembly 10, and through which the drill bit extends. When the suction inlet is in contact with a workpiece during a drilling operation, the shroud encloses a portion of the drill bit and the surrounding region of the work piece to maintain the region at a sub-atmospheric pressure. In other words, the vacuum created in the suction pipe 18 and the suction head 64 draws dust and other debris generated during the drilling and/or hammering operation from the shroud and through the suction pipe 18, for depositing in the container 30.

Figure 3:
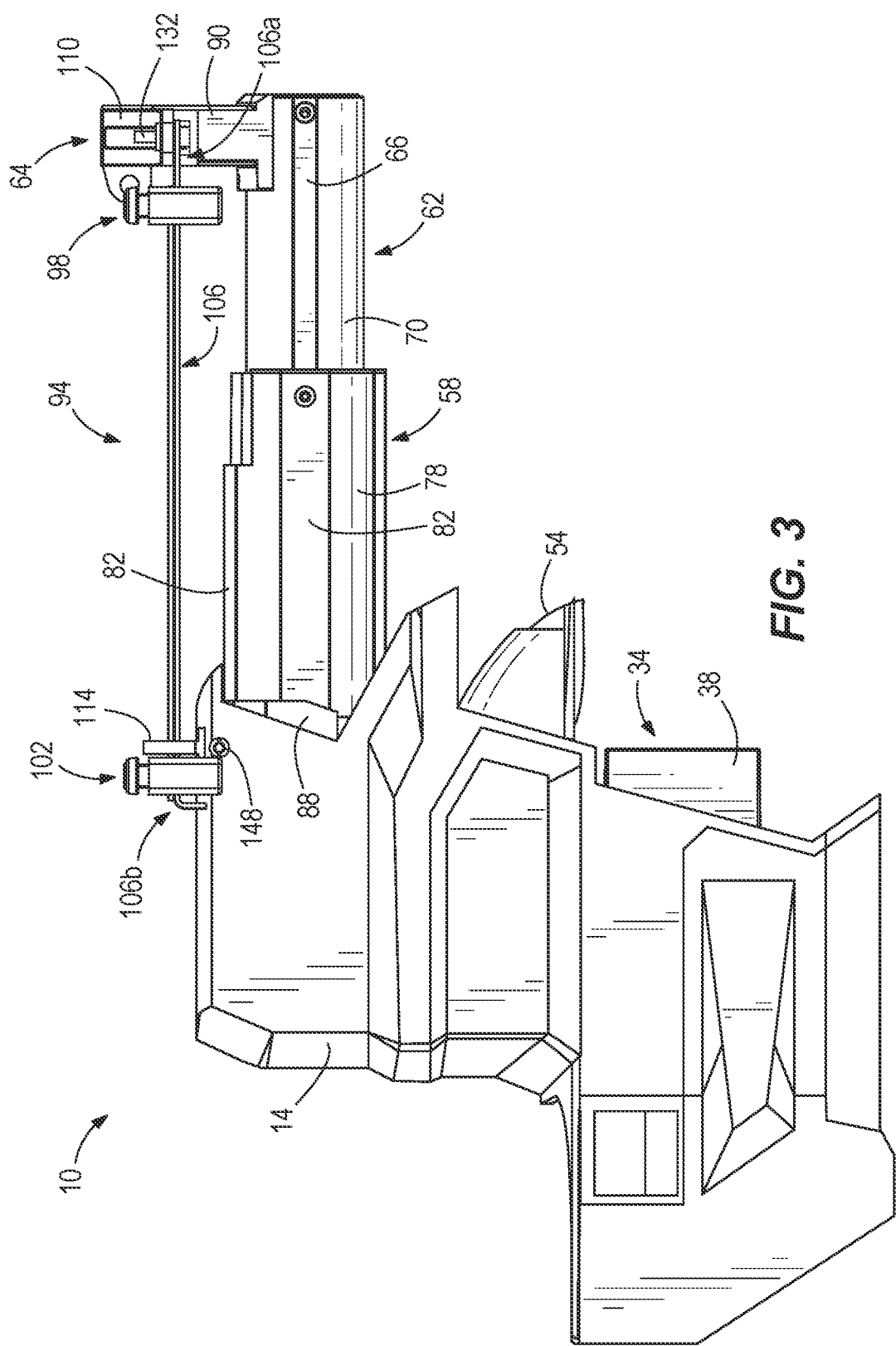
FIG. 3 is a side view of the dust collector assembly of FIG. 1, with the dust container removed.
Figure 4:
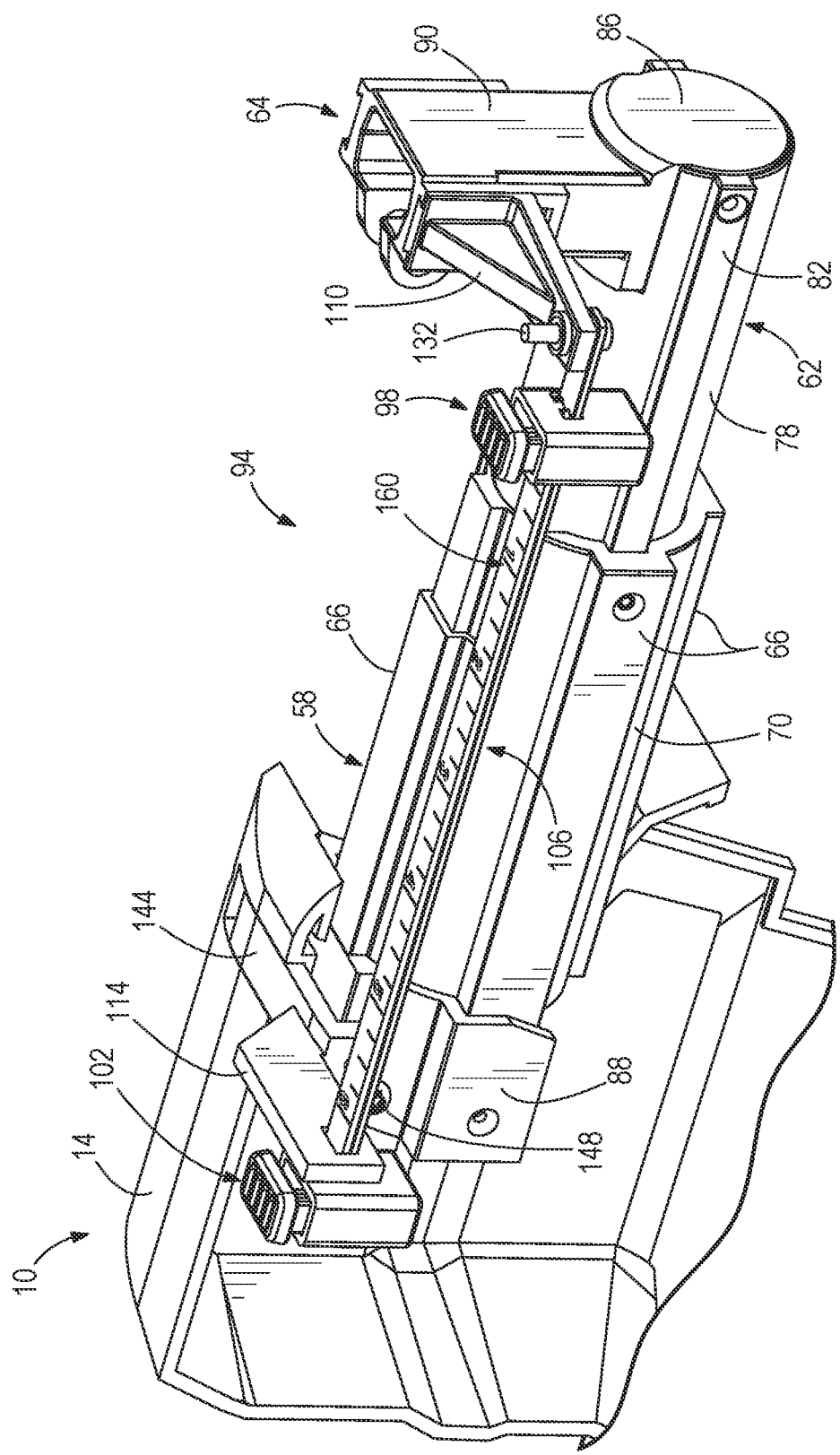
FIG. 4 is a perspective view of a telescoping suction pipe of the dust collector assembly of FIG. 1, with a portion of a housing of the dust collector assembly removed.

With reference to FIGS. 1-4, the dust collector assembly 10 includes a depth stop assembly 94 to limit the axial movement of the suction pipe 18 in either an extended direction (i.e., away from the housing 14), a retracted direction (i.e., toward the housing 14), or both. In particular, the depth stop assembly 94 includes a plunge depth stop 98 and an extension stop 102 positioned on a rail 106 (FIGS. 3 and 4). The plunge depth stop 98 is movable along the length of the rail 106 and limits the extent to which the suction pipe 18 may retract into the housing 14, and in turn, limits the extent to which the drill bit can plunge into the workpiece. The plunge depth stop 98 is movable along the length of the rail 106 and is selectively fixed to the rail 106 to limit the extent to which the suction pipe 18 may telescope relative to the housing 14.

A first end 106a of the rail 106 is removably coupled to the inner pipe 62 via a first bracket 110, which is removably coupled to the suction head 64. As illustrated in FIG. 5, the first bracket 110 includes a flange 120 that is slidably received within a corresponding groove 124a within the arm 90 of the suction head 64. In the illustrated embodiment, the flange 120 and groove 124a each include a dovetail shape such that when the flange 120 is received within the groove 124a, the bracket 110 is laterally constrained relative to the arm 90. Also, in the illustrated embodiment, the arm 90 includes two grooves 124a, 124b spaced on opposite sides of the arm 90. The first end 106a of the rail 106 includes an aperture 128 (FIG. 7A) configured to receive a fastener 132. The fastener 132 is positionable within the aperture 128, and then threaded to a threaded bore 130 (FIG. 5) in the first bracket 110 to secure the first end 106a of the rail 106 to the first bracket 110.

With reference to FIGS. 1-4, the extension stop 102 is movable along the length of the rail 106 and can be selectively fixed to the rail 106. The extension stop 102 limits the extent to which the suction pipe 18 may extend from the housing 14. The extension stop 102 can be used to adjust the extension length of the suction pipe 18 to correspond to the length of the drill bit being used. For example, when using a 4-inch drill bit, the extension length of the suction pipe 18 can be reduced to 4 inches to correspond to the length of the drill bit. If the extension length of the suction pipe 18 is not limited, then the end of the suction pipe 18 may extend beyond the end of the drill bit.

The rail 106 is also slidably coupled to the housing 14 via a second bracket 114. Specifically, the second bracket 114 includes an aperture 136 (FIG. 6) through which the rail 106 extends and a U-shaped connector 144 engagable with the mounting member 88. The connector 144 is removably coupled to the mounting member 88 via fasteners 148, which extend through opposite sides of the housing 14 (FIGS. 1 and 2).

In the illustrated embodiment, the rail 106 extends parallel with the suction pipe 18, and provides additional strength and rigidity to the suction pipe 18. In addition, the dust collector assembly 10 also includes a ruler 160 (FIG. 4) configured to slide (i.e., translate) relative to the rail 106. The ruler 160 is operable to set a plunge depth of the suction pipe 18 and the drill bit, and is movable with the plunge depth stop 98. The rail 106 includes a series of holes 164 (FIG. 7A) that are engagable by the plunge depth stop 98 and the extension stop 102 to set the plunge depth and the extension depth, respectively.

FIGS. 7A-7B illustrate an enlarged view and a cutaway view, respectively, of the plunge depth stop 98. Although not shown, the extension stop 102 includes the same internal components as the plunge depth stop 98, and thus is adjustable along the length of the rail 106 in the same manner as the plunge depth stop 98. The plunge depth stop 98 includes an actuator (e.g., a button 172) that is slidably received within a housing 176, which in turn has a slot 140 (FIG. 7A) in which the rail 106 is received. In its home position, the button 172 is biased away from the housing 176 (i.e., upward from the frame of reference of FIG. 7B) by a spring 174. When in the home position, a pin 184 integrated with the button 172 is received within one of the holes 164 in the rail 106, for example, to set the plunge depth of the suction pipe 18. To readjust the plunge depth setting, a user can press the button 172 against the bias of the spring 174 to remove the pin 184 from one of the holes 164 and while holding the button 172 in a depressed state, realign the plunge depth stop 98 with a different hole 164 in the rail 106.

The ruler 160, which is attached to the plunge depth stop 98 for movement therewith, includes a scale coinciding with the desired plunge depth of the suction pipe 18 and the drill bit. The scale is referenced to the second bracket 114 when setting the plunge depth of the suction pipe 18. Once the plunge depth is set, during a drilling, hammer-drilling, or chiseling operation, the plunge depth stop 98 retracts rearward relative to the housing 14 with the suction pipe 18. Rearward movement of the suction pipe 18 is limited by engagement between the plunge depth stop 98 and the second bracket 114. Likewise, once the extension length of the suction pipe 18 is set (i.e., by positioning the extension stop 102 along the rail 106 in the manner described above), the forward movement or extension of the suction pipe 18 is limited by engagement between the extension stop 102 and the second bracket 114 (as shown in each of FIGS. 1-4).

The depth stop assembly 94 is "flippable" such that the assembly 94 may be positioned on either side of the housing 14 and suction pipe 18. In order to reposition the depth stop assembly 94 on the opposite side of the housing 14, the user first detaches the depth stop assembly 94 from the housing 14 and the suction pipe 18. In order to do so, the user removes the fasteners 148, thereby detaching the second bracket 114 from the housing 14. Then, the user unscrews the fastener 132 from the first bracket 110, permitting the front end 106a of the rail 106 to be lowered relative to the first bracket 110. The user then depresses the button 172 of the plunge depth stop 98 and slides the plunge depth stop 98 (with the attached ruler 160) off the rail 106. Then, to remove the first bracket 110 from the suction head 64, the user slides the first bracket 110 in an upward direction, until the flange 120 slides out of engagement with the groove 124a of the arm 90. The depth stop assembly 94 is now detached from the housing 14 and suction pipe 18.

In order to secure the depth stop assembly 94 to the opposite side of the housing 14 and suction pipe, the user slides the first bracket 110 into engagement with the other groove 124b within the arm 90. Additionally, the user flips the second bracket 114 such that it now extends in the same direction as the first bracket 110, repositions the second bracket 114 on the mounting member 88, and secures the second bracket 114 to the mounting member 88 via the fasteners 148. The user then slides the rail 106 (with the attached extension stop 102) through the aperture 136 of the second bracket 114. The ruler 160 is replaced on top of the rail 106, which is inserted through the slot 140 until the first end 106a of the rail 106 protrudes from the plunge depth stop 98. Lastly, the first end 106a of the rail 106 is secured to the first bracket 110 via the fastener 132 in the manner described above. Accordingly, the depth stop assembly 94 is repositionable on either side of the housing 14 to accommodate placement of the rotary power tool on a desired side of the dust collector assembly 10, depending on the user's preference.

Various features of the invention are set forth in the following claims.

What is claimed is:

1. A dust collector for use with a hand-held power tool, the dust collector comprising:
    a housing;
    a suction pipe coupled to the housing and movable between an extended state and a retracted state;
    a suction head coupled to an end of the suction pipe and movable relative to the housing in response to the suction pipe moving between the extended state and the retracted state;
    an electric motor positioned in the housing;
    a suction fan driven by the electric motor and operable to generate a vacuum in the suction pipe; and
    a depth stop assembly configured to limit axial movement of the suction pipe, wherein the depth stop assembly includes a first bracket configured to be alternately directly positioned on opposite sides of the suction head in a first configuration and a second configuration, respectively without repositioning of the suction head.

2. The dust collector of claim 1, wherein the depth stop assembly includes a rail, and a depth stop and an extension stop adjustably positioned on the rail.

3. The dust collector of claim 2, further comprising a ruler coupled to the depth stop and slidable relative to the rail.

4. The dust collector of claim 2, wherein the first bracket is removably coupled to a first side of the suction head when the depth stop assembly is in the first configuration.

5. The dust collector of claim 4, wherein the first bracket is removably coupled to an opposite, second side of the suction head when the depth stop assembly is in the second configuration.

6. The dust collector of claim 5, wherein the first bracket includes a flange slidably received within a first groove on the first side of the suction head when the depth stop assembly is in the first configuration, and a second groove on the second side of the suction head when the depth stop assembly is in the second configuration.

7. The dust collector of claim 4, further comprising a second bracket removably coupled to the housing, wherein a first end of the rail is removably coupled to the first bracket and a second end of the rail is removably coupled to the second bracket.

8. A dust collector for use with a hand-held power tool, the dust collector comprising:
a housing;
a suction pipe coupled to the housing and movable between an extended state and a retracted state;
a suction head coupled to an end of the suction pipe and movable relative to the housing in response to the suction pipe moving between the extended state and the retracted state;
an electric motor positioned in the housing;
a suction fan driven by the electric motor and operable to generate a vacuum in the suction pipe; and
a depth stop assembly configured to limit axial movement of the suction pipe, the depth stop assembly including a rail, a depth stop and an extension stop adjustably positioned on the rail, and a bracket removably coupled to the suction head;
wherein the bracket is configured to be alternately directly positioned on opposite sides of the suction head in a first configuration and a second configuration, respectively.

9. The dust collector of claim 8, wherein the bracket is removably coupled to a first side of the suction head when the depth stop assembly is in the first configuration, and the bracket is removably coupled to a second side of the suction head when the depth stop assembly is in the second configuration.

10. The dust collector of claim 9, wherein the bracket includes a flange slidably received within a first groove on the first side of the suction head and a second groove on the second side of the suction head.

11. The dust collector of claim 8, further comprising a ruler coupled to the depth stop and slidable relative to the rail.

12. The dust collector of claim 8, wherein the bracket is a first bracket, wherein the dust collector further comprises a second bracket coupled to the housing, and wherein a first end of the rail is removably coupled to the first bracket and a second end of the rail is removably coupled to the second bracket.

13. The dust collector of claim 8, wherein the rail includes a plurality of apertures engagable by the depth stop and the extension stop.

14. The dust collector of claim 13, wherein each of the depth stop and the extension stop includes a pin configured to engage the apertures.

15. The dust collector of claim 8, wherein each of the depth stop and the extension stop includes a body, an actuator slidably received within the body, and a spring configured to bias the actuator away from the body.

16. A dust collector for use with a hand-held power tool, the dust collector comprising:
a housing;
a suction pipe coupled to the housing and movable between an extended state and a retracted state;
a suction head coupled to an end of the suction pipe and movable relative to the housing in response to the suction pipe moving between the extended state and the retracted state;
an electric motor positioned in the housing;
a suction fan driven by the electric motor and operable to generate a vacuum in the suction pipe; and
a depth stop assembly configured to limit axial movement of the suction pipe, the depth stop assembly including
a rail having a first end removably coupled to a first bracket and a second end removably coupled to a second bracket, and
a depth stop and an extension stop adjustably positioned on the rail;
wherein the depth stop assembly is configured to be alternately positioned in a first configuration when the first bracket is coupled to a first side of the suction head and the second bracket is coupled to a first side of the housing, and a second configuration when the first bracket is coupled to a second side of the suction head and the second bracket is coupled to a second side of the housing.

17. The dust collector of claim 16, wherein the first bracket includes a flange slidably received within a first groove on the first side of the suction head when the depth stop assembly is in the first configuration, and wherein the flange is slidably received within a second groove on the second side of the suction head when the depth stop assembly is in the second configuration.

18. The dust collector of claim 16, wherein the second bracket includes an aperture and a connector removably coupled to the housing.

19. The dust collector of claim 18, wherein the rail is configured to extend through the aperture of the second bracket.

20. The dust collector of claim 16, wherein the depth stop assembly includes a ruler coupled to the depth stop and slidable relative to the rail, and wherein the rail includes a plurality of apertures engagable by the depth stop and the extension stop.

* * * * *